(No Model.)

W. P. WALTER.
STOVE PIPE FASTENER.

No. 372,395. Patented Nov. 1, 1887.

Witnesses
@ Morris
B. Ashley.

Inventor
Wm. Penn Walter.
By his Attorney
Herbert W. T. Jenner.

United States Patent Office.

WILLIAM PENN WALTER, OF NEWTON, KANSAS.

STOVE-PIPE FASTENER.

SPECIFICATION forming part of Letters Patent No. 372,395, dated November 1, 1887.

Application filed January 18, 1887. Serial No. 224,697. (No model.)

*To all whom it may concern:*

Be it known that I, WILLIAM PENN WALTER, a citizen of the United States, residing at Newton, in the county of Harvey and State of Kansas, have invented certain new and useful Improvements in Stove-Pipe Fasteners; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fasteners for securing the end of a stove-pipe in the hole of a wall while the stove is in use; and it consists in the novel construction and combination of the parts, hereinafter fully described and claimed, for holding the stove-pipe, and also for preventing the issue of smoke between the pipe-collar and the wall.

Figure 1:
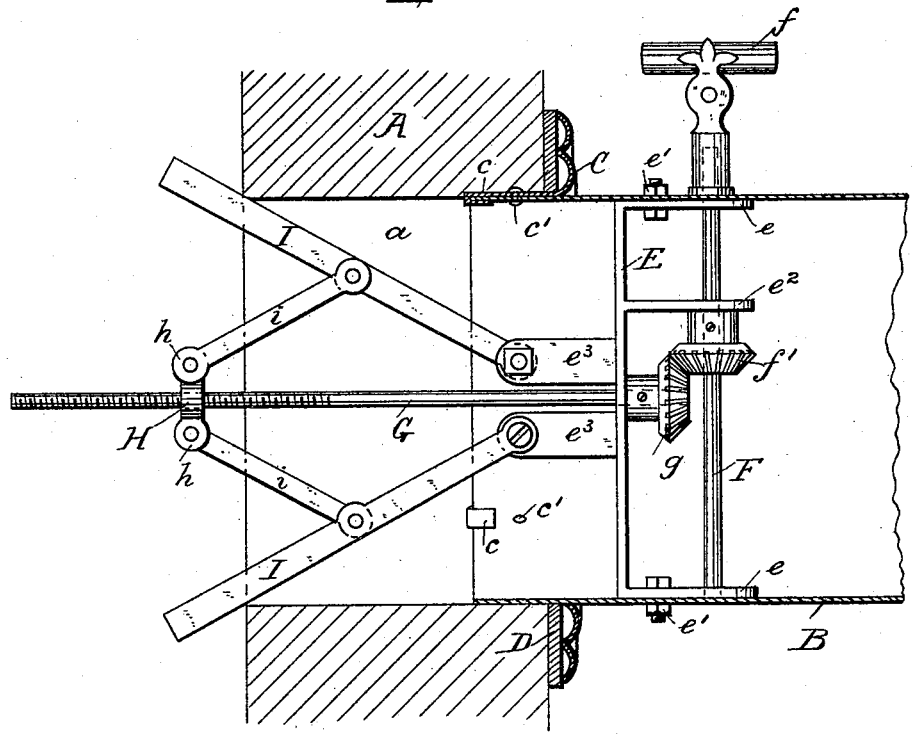
Figure 2:
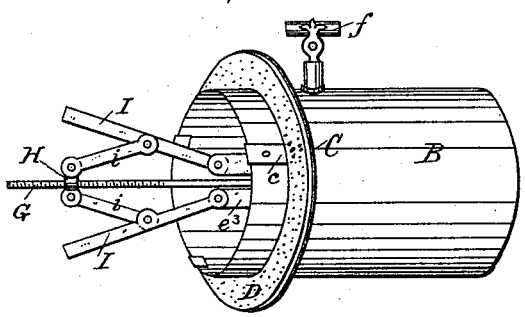

In the drawings, Figure 1 is a longitudinal section through a wall and the end of a stove-pipe, showing the fastener in use. Fig. 2 is a perspective view of the end of a stove-pipe, showing the fastener ready to be applied.

A is a portion of a wall having a hole, $a$, for the stove-pipe in the ordinary manner.

B is the end of a stove-pipe inserted in the said hole in the wall.

C is the collar which surrounds the stove-pipe. This collar is provided with hooked distance-pieces $c\,c$, which may either be formed in one piece with the collar or fastened onto it. These distance-pieces hook over the end of the pipe and prevent the collar from sliding too far along it.

$c'$ are rivets for securing the distance-pieces to the pipe.

D is a washer, of india-rubber, asbestus, or other similar material, interposed between the collar C and the wall, to prevent any smoke from leaking out when the collar is drawn tight against it.

E is a frame extending across the inside of the pipe, and provided with the lugs $e$, secured to the pipe by means of rivets or bolts $e'$, and with an intermediate lug, $e^2$, upon the same side of it as the lugs $e$. The frame E is also provided with lugs $e^3$ on the opposite side of it.

F is a spindle journaled in the lugs $e\,e^2$, and having secured upon it the handle $f$ outside the pipe, and the bevel-pinion $f'$ inside the pipe.

G is a screwed spindle, one end of which is journaled in the frame E, and has secured to it the bevel-pinion $g$, which gears into the bevel-pinion $f'$.

H is a nut provided with lugs $h$ and working upon the screwed spindle F.

I are arms pivoted at one end to the lugs $e^3$ of frame E, and connected to nut H by the links $i$, which are pivotally connected to the lugs $h$ and to the arms I about half-way between the ends of the arms.

The stove-pipe is inserted into the hole in the wall, when the device is in the position shown in Fig. 2, and by turning the handle outside the pipe the free ends of the arms I are expanded or forced apart until they bear upon the wall and hold the pipe securely fixed, as shown in Fig. 1.

What I claim is—

1. The combination of a stove-pipe, a collar secured on the pipe, a frame secured inside the pipe, expansible arms pivoted to the frame, a screwed spindle journaled in the frame and provided with a nut, links pivotally connecting the nut with the said arms, and a handle secured on a second spindle, passing through a hole in the pipe and connecting directly or by intermediate mechanism with the said screwed spindle, whereby said screw-spindle may be revolved from outside the stove-pipe.

2. The combination of a stove-pipe, a collar secured on the pipe, a frame secured inside the pipe, expansible arms pivoted to the frame, a screwed spindle provided with a nut, links pivotally connecting the nut with the said arms, a spindle provided with a handle outside the pipe, and beveled pinions for connecting the two spindles, so that the arms may be expanded by turning the handle.

3. The combination of a stove-pipe, a collar secured to the pipe, a packing-washer interposed between the collar and the wall, a frame secured inside the pipe, expansible arms pivoted to the frame, a screwed spindle provided with a nut, links pivotally connecting the nut with the said arms, a spindle provided with a handle outside the pipe, and beveled pinions for connecting the two spindles, so that the arms may be expanded by turning the handle.

In testimony whereof I affix my signature in presence of two witnesses.

WILLIAM PENN WALTER.

Witnesses:
BASIL McKEE,
WILLIAM C. GARRETT.